United States Patent [19]

Boots

[11] Patent Number: 4,614,009
[45] Date of Patent: Sep. 30, 1986

[54] LOCKING MEMBER FOR AN OPEN ROOF CONSTRUCTION FOR A VEHICLE

[75] Inventor: Robert T. Boots, Haarlem, Netherlands

[73] Assignee: Vermeulen-Hollandia Octrooien II B.V., Haarlem, Netherlands

[21] Appl. No.: 694,283

[22] Filed: Jan. 24, 1985

[30] Foreign Application Priority Data

Jan. 25, 1984 [NL] Netherlands ............... 8400228

[51] Int. Cl.$^4$ .................................... F16C 1/10
[52] U.S. Cl. ..................................... 74/501R; 74/528; 49/279
[58] Field of Search ............... 74/501 R, 528; 49/279, 49/281, 301

[56] References Cited

U.S. PATENT DOCUMENTS

| 2,841,034 | 7/1958 | Greene | 74/528 |
| 3,075,407 | 1/1963 | Werner | 74/501 R |
| 3,789,645 | 2/1974 | Schmid | 74/501 R |

*Primary Examiner*—Harold W. Weakley
*Attorney, Agent, or Firm*—Pahl, Lorusso & Loud

[57] ABSTRACT

A locking member for an open roof construction for a vehicle.

This open roof construction is provided with a panel, which in the closed position closes an opening in the roof of the vehicle and which is movable from this closed position or to this closed position by means of at least one push-pull cable. This push-pull cable is displaceable by means of a driving wheel, which is rotatable in two opposite directions, while a locking member at least substantially prevents a rotation of the driving wheel by the push-pull cable. This locking member comprises two cooperating locking parts, the first one of these locking parts being stationary and the second locking part, when at rest, being maintained in the locked position, while this second locking part can first be brought from its locked position into its released position with respect to the stationary locking part by means of an actuating member and can thereafter be rotated in the two opposite directions, which rotation is followed by the driving wheel. Both locking parts comprise teeth or the like, which are in engagement with each other in the locked position.

11 Claims, 3 Drawing Figures

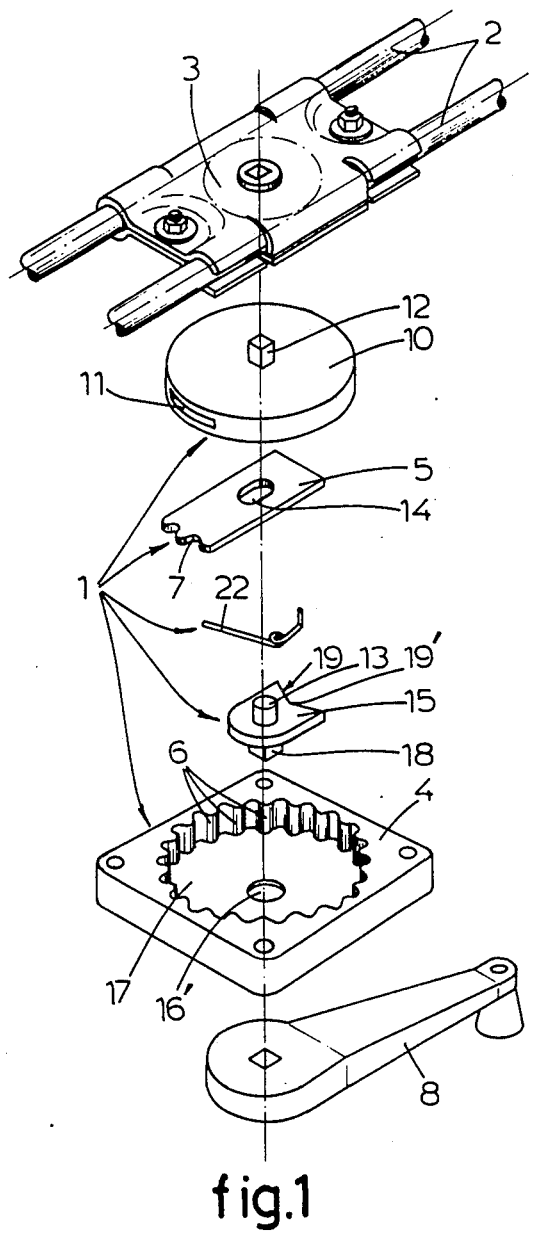
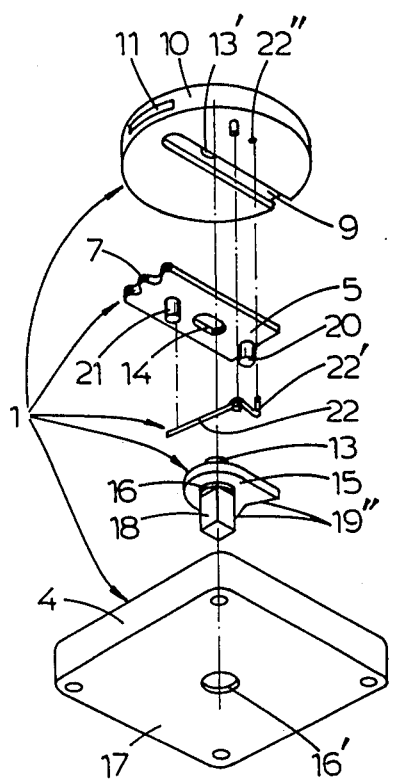
fig.1
fig.2

LOCKING MEMBER FOR AN OPEN ROOF CONSTRUCTION FOR A VEHICLE

The invention relates to a locking member for an open roof construction for a vehicle.

This open roof construction is provided with a panel, which in the closed position closes an opening in the roof of the vehicle and which is movable from this closed position or to this closed position by means of at least one push-pull cable. This push-pull cable is displaceable by means of a driving wheel, which is rotatable in two opposite directions, while a locking member at least substantially prevents a rotation of the driving wheel by the push-pull cable. This locking member comprises two cooperating locking parts, the first one of these locking parts being stationary and the second locking part, when at rest, being maintained in the locked position, whilst this second locking part can first be brought from its locked position into its released position with respect to the stationary locking part by means of an actuating member and can thereafter be rotated in the two opposite directions, which rotation is followed by the driving wheel.

In a known embodiment of such a locking member for an open roof construction the stationary locking part is a shaft, on which the driving wheel is journalled on the one hand and on which the actuating means, in this case a crank, is journalled on the other hand. The second locking part is formed by a torsion spring, which is mounted around this stationary shaft and which frictionally engages this shaft. This torsion spring comprises a plurality of windings and two projecting end parts. In the rest position of the torsion spring, in which no forces are exerted on its projecting end parts, the frictional force between the torsion spring and the stationary shaft is so strong, that no rotation of the torsion spring with respect to the stationary shaft can take place. The driving wheel and the crank are provided with cooperating projecting cams, which can engage the projecting end parts of the spring, or each other. When the crank is rotated, its cam engages an end part of the spring, whereupon the torsion spring is deformed to such extent that the friction between this spring and the stationary shaft becomes smaller. Hereafter a rotation of the torsion spring about the shaft is possible, whereupon a further rotation of the crank will result in a rotation of the driving wheel by means of the cooperation of the cam on the crank with the cam on the driving wheel. If, however, the push-pull cable exerts a moment on the driving wheel, the cam of the driving wheel comes into engagement with one end part of the torsion spring and loads this torsion spring in such a way, that the friction between the torsion spring and the stationary shaft is till increased. In this manner a further rotation of the driving wheel by the push-pull cable is prevented.

This known locking member has the disadvantage, that during a displacement of the panel by means of the crank the torsion spring has to be continually rotated about the stationary shaft, whereby considerable frictional forces have to be overcome. This makes the operation of the panel rather heavy. Further, free strokes are present between the cam on the crank and the projecting end parts of the torsion spring on the one hand and the cam on the driving wheel and these end parts of the spring on the other hand. This leads to an undesirable play in the construction and results in that the crank in the position in which it is not operated, is not completely locked and can therefore rattle.

It is an object of the present invention to provide a locking member for an open roof construction for a vehicle, wherein these disadvantages are removed in an efficient way.

For this purpose the locking member according to the invention is characterized in that both locking parts comprise teeth or the like, which are in engagement with each other in the locked position.

In this manner it can be achieved that in the released position no engagement between the two locking parts takes place any more, so that a light displacement of the panel is possible.

Further, in the locked position both the crank and the driving wheel are locked practically without play, so that a rattling of the crank is effectively prevented.

In a simple embodiment of the invention the stationary locking part is provided with internal teeth, while the second locking part comprises external teeth and can be rectilinearly reciprocated by means of the actuating member between the locked position and the released position.

Further, in order to obtain a simple and compact construction a spring may load the second locking part in the direction of the locked position. This spring has to be dimensioned in such a way, that the second locking part is brought by this spring into the locked position when no further external forces are exerted thereon.

In a preferred embodiment of the locking member according to the invention the second locking part consists of a locking plate, which is provided with the teeth on one end thereof, and which is slidable forwards and backwards in a guide in a carrier housing, which carrier housing is centrally journalled in the stationary locking part inside the internal teeth thereof, and comprises a lateral passage slot adjoining the guide, through which passage slot the teeth of the locking plate can be brought into or out of engagement with the internal teeth of the stationary locking part.

In this case the carrier housing may be coupled with the driving wheel and may form a bearing for a stop pin, which stop pin is passed through a slot in the locking plate, which slot extends in the direction of displacement of the locking plate, whilst the stop pin is connected to an operating plate for the locking plate, while a bearing pin extends coaxially with the stop pin at the opposite side of the operating plate, which bearing pin is journalled in an end wall of the stationary locking part, a driving stud being connected to this bearing pin.

Further, in order to accurately define the displacement of the locking plate, in the locked position the one end of the slot in the locking plate may be in engagement with the stop pin on the operating plate, while in the released position the other end of this slot may be in engagement with this stop pin.

The invention will hereinafter be elucidated with reference to the drawing, which shows an embodiment by way of example of a locking member according to the invention for an open roof construction.

FIG. 1 is an exploded view, seen from the upper side, of the parts of a locking member according to the invention, as well as of a crank and of the housing of a driving wheel.

FIG. 2 is an exploded view, seen from the lower side, of the parts of the locking member shown in FIG. 1.

Figure 3A:
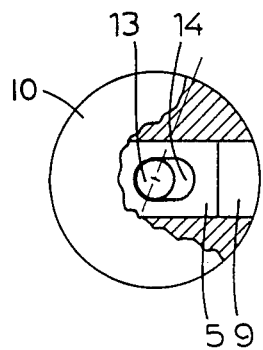
FIG. 3 shows the various positions of the parts of the locking member according to FIGS. 1 and 2.

The drawing shows an embodiment by way of example of a locking member, which is indicated in its entirety with the reference number 1 and which is used with an open roof construction for a vehicle. This open roof construction comprises a panel (not shown), which in its closed position closes an opening in the roof of the vehicle and which may be moved from this closed position or towards this closed position by means of push-pull cables 2, which are displaceable by means of a driving wheel, which is indicated in FIG. 1 with a broken line and which is rotatable in two opposite directions and which is accommodated in a housing 3.

The locking member 1 serves to prevent a rotation of the driving wheel by the push-pull cables 2 and comprises two cooperating locking parts 4 and 5.

The locking part 4 is stationary and is provided with internal teeth 6, while the locking part 5 has teeth 7. This locking part 5 can be rectilinearly reciprocated by means of an actuating member between a locked position, in which the teeth 6, 7 of the two locking parts 4, 5 are in engagement with each other, and a released position, in which these teeth 6, 7 are completely free from each other. In the embodiment shown a crank 8 has been applied as the actuating member, but this actuating member may e.g. also consist of a motor or the like driving means. After the released position is reached, the crank 8 may be rotated further, in order to displace the panel.

When the locking part 5 is in rest, this locking part 5 is maintained in the locked position under the influence of spring pressure.

The locking part 5 consists of a locking plate, which is provided with the teeth 7 on one end and which is slidable forwards and backwards in a straight guide 9 in a carrier housing 10. This carrier housing 10 has a cylindrical side wall and is centrally journalled in the stationary locking part 4 inside the internal teeth 6 thereof.

The carrier housing 10 comprises a lateral passage slot 11 adjoining the guide 9. Through this passage slot 11 the teeth 7 of the locking plate 5 can be brought into or out of engagement with the internal teeth 6 of the stationary locking part 4.

The locking part 5 is first brought from its locked position into its released position with respect to the stationary locking part 4 by means of the actuating member, i.e. in the embodiment according to FIG. 1 by means of a rotation of the crank 8 in one of the two opposite directions, whereafter this crank 8 can be further rotated in the direction in question. This latter rotation is followed by the driving wheel, whereby the panel is displaced by the push-pull cables 2.

To this end the carrier housing 10 is coupled with the driving wheel in the housing 3 by means of a square stud 12, while this carrier housing 10 forms a bearing 13' for a stop pin 13, which is passed through a slot 14 in the locking plate 5. This slot 14 extends in the direction of displacement of the locking plate 5, whilst the stop pin 13 is mounted on an operating plate 15 for the locking plate 5.

A bearing pin 16 extends coaxially with the stop pin 13 at the opposite side of the operating plate 15. This bearing pin 16 is journalled in a hole 16' in an end wall 17 of the stationary locking part 4. A driving stud 18 is connected to this bearing pin 16 and projects beyond the end wall 17 of the stationary locking part 4.

In the embodiment shown in FIG. 1, in which the crank 8 is applied as the actuating member, this crank 8 is mounted on the end of the driving stud 18, which projects beyond the end wall 17 of the stationary locking part 4.

If, however, an other driving member than this crank 8, e.g. a driving motor, is used, this driving member is coupled with the driving stud 18.

In the locked position the one end of the slot 14 in the locking plate 5 is in engagement with the stop pin 13 on the operating plate 15, while in the released position the other end of this slot 14 is in engagement with this stop pin 13, so that the path along which the locking plate 5 is displaced, is accurately determined.

The operating plate 15 has a V-shaped groove 19, which is in engagement with a sliding pin 20 connected to the locking plate 5. In the locked position of the locking plate 5 this sliding pin 20 lies in the apex 19' of the V-shaped groove 19, while upon rotation of the operating plate 15 in the one or in the other direction by means of the driving stud 18 this sliding pin 20 slides along one of the sides 19" of the V-shaped groove 19 and displaces the locking plate 5 to the released position.

The locking plate 5 carries a second pin 21, while the carrier housing 10 supports a spring 22, which has an end 22' that is inserted in a hole 22" in the carrier housing 10. The spring 22 engages this second pin 21 and loads the locking plate 5 in the direction of the locked position. Upon release of the actuating member (the crank 8) the spring 22 displaces the locking plate 5 to the locked position, while the operating plate 15 and the crank 8 obtain an angular displacement.

As appears from FIGS. 1 and 2 the axes of rotation of the driving wheel, the carrier housing 10 and the operating plate 15 coincide and these axes of rotation extend vertically.

Figure 3C:
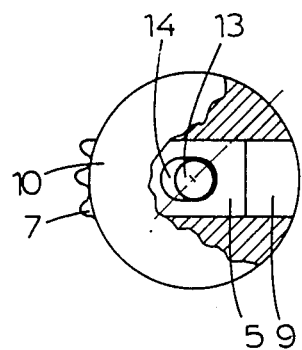
Figure 3E:
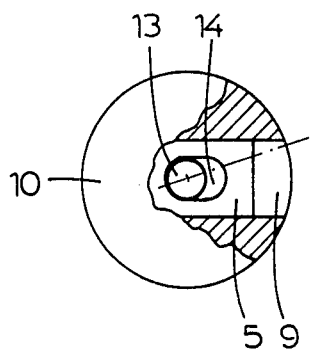
Figure 3B:
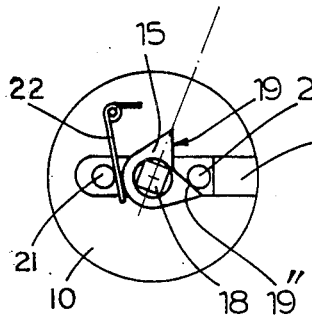

In FIGS. 3a, 3b which are connected with each other, the locking member 1 is shown in the released position, whilst the actuating member (the crank 8) is rotated in the anti-clockwise direction. The left end of the slot 14 in the locking plate 5 has struck the stop pin 13, while the sliding pin 20 mounted on the locking plate 5 has been displaced along the one side 19" of the V-shaped groove 19 and has displaced the locking plate 5 to the released position against the action of the spring 22. Upon a further rotation of the crank 8 the carrier housing 10 and therefore the driving wheel accommodated in the housing 3 is rotated through the driving stud 18, the operating plate 15, the sliding pin 20 and the locking plate 5, whereby the push-pull cables 2, which are in engagement with the driving wheel carry out a displacement of the panel.

Figure 3D:
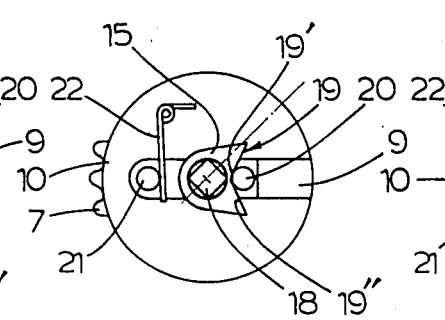

In FIGS. 3c and 3d, which are again connected with each other, the crank 8 is released, whereafter the locking plate 5 is slid to the left under the influence of the spring 22, engaging the pin 21, until the right end of the slot 14 in the locking plate 5 has come into engagement with the stop pin 13. In this position the teeth 7 of the locking plate 5 are in engagement with the internal teeth 6 of the stationary locking part 4. In this locked position the driving wheel is locked and a rotation of this driving wheel through the push-pull cables 2 is not possible. Further the crank 8 is locked as well, so that the same cannot rattle.

Figure 3F:
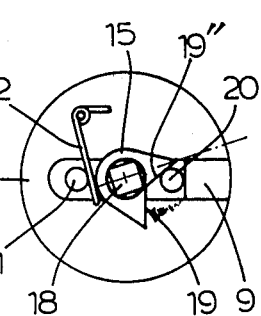

In FIGS. 3e and 3f, which are also connected with each other, the locking member 1 again takes up the released position, while the crank 8 is rotated in the clockwise direction. In this case the sliding pin 20 is moved along the other side of the V-shaped groove 19 in the operating plate 15, until the left end of the slot 14 in the locking plate 5 has come into engagement with the stop pin 13 on the operating plate 15 and the teeth 7 of the locking plate 5 are brought out of engagement with the internal teeth 6 of the stationary locking part 4. Upon further rotation of the crank 8 in the direction in question the panel is displaced again in the manner as elucidated hereinbefore in connection with FIGS. 3a, 3b. The difference between FIGS. 3a, 3b on the one hand and FIGS. 3e, 3f on the other hand consists in that the crank 8 is rotated in opposite directions, so that the movement of the panel is also in opposed directions.

The locking member 1 for an open roof construction as described hereinbefore has the important advantage, that the rotation of the driving wheel by means of the actuating member (the crank 8) can take place very lightly as soon as the teeth 7 of the locking plate 5 are out of engagement with the internal teeth 6 of the stationary locking part 4.

The invention is not restricted to the embodiment shown in the drawing by way of example, which can be varied in several ways within the scope of the appended claims.

I claim:

1. Locking member for an open roof construction for a vehicle, operated by means of at least one push-pull cable, which is displaceable by means of a driving wheel, which is rotatable in two opposite directions, while the locking member at least substantially prevents a rotation of the driving wheel by the push-pull cable, which locking member comprises two cooperating locking parts, the first one of these locking parts being stationary and the second locking part, when at rest, being maintained in the locked position, whilst this second locking part can first be brought from its locked position into its released position with respect to the stationary locking part by means of an actuating member and can thereafter be rotated in the two opposite directions, which rotation is followed by the driving wheel, both locking parts comprising teeth or the like, which are in engagement with each other in the locked position.

2. Locking member according to claim 1, wherein the stationary locking part is provided with internal teeth, while the second locking part comprises external teeth and can be rectilinearly reciprocated by means of the actuating member between the locked position and the released position.

3. Locking member according to claim 2, wherein a spring loads the second locking part in the direction of the locked position.

4. Locking member according to claim 3, wherein the second locking part consists of a locking plate, which is provided with the teeth on one end thereof, and which is slidable forwards and backwards in a guide in a carrier housing, which carrier housing is centrally journalled in the stationary locking part inside the internal teeth thereof, and comprises a lateral passage slot adjoining the guide, through which passage slot the teeth of the locking plate can be brought into or out of engagement with the internal teeth of the stationary locking part.

5. Locking member according to claim 4, wherein the carrier housing is coupled with the driving wheel and forms a bearing for a stop pin, which stop pin is passed through a slot in the locking plate, which slot extends in the direction of displacement of the locking plate, whilst the stop pin is connected to an operating plate for the locking plate, while a bearing pin extends coaxially with the stop pin at the opposite side of the operating plate, which bearing pin is journalled in an end wall of the stationary locking part, a driving stud being connected to this bearing pin.

6. Locking member according to claim 5, wherein in the locked position the one end of the slot in the locking plate is in engagement with the stop pin on the operating plate, while in the released position the other end of this slot is in engagement with this stop pin.

7. Locking member according to claim 6, wherein the driving stud is connected with a crank beyond the end wall of the stationary locking part.

8. Locking member according to claim 7, wherein the operating plate has a V-shaped groove, which is in engagement with a sliding pin mounted on the locking plate, which sliding pin lies in the apex of the groove in the locked position of the locking plate, while, upon rotation of the operating plate by means of the driving stud in the one or in the other direction, the sliding pin slides along one of the sides of the V-shaped groove and displaces the locking plate to the released position.

9. Locking member according to claim 8, wherein the locking plate carries a second pin and the carrier housing supports the spring, which engages this second pin and which, upon release of the crank, displaces the locking plate to the locked position, while the operating plate and the crank obtain an angular displacement.

10. Open roof construction according to claim 9, wherein the axes of rotation of the driving wheel, the carrier housing and the operating plate coincide and extend at least approximately vertically.

11. Open roof construction according to claim 10, wherein the carrier housing has a cylindrical side wall.